United States Patent
Sprague et al.

(10) Patent No.: US 11,507,964 B2
(45) Date of Patent: Nov. 22, 2022

(54) FORWARD CONTEXT BROWSING

(71) Applicant: Popdust, Inc., Wilmington, DE (US)

(72) Inventors: Michael Sprague, New York, NY (US); George Mario Fortuna, Cold Spring, NY (US); Sameet U. Durg, New York, NY (US); Joseph A. Fortuna, Jr., Lake Huntington, NY (US)

(73) Assignee: Popdust, Inc., Wilmington, DE (US)

(*) Notice: Subject to any disclaimer, the term of this patent is extended or adjusted under 35 U.S.C. 154(b) by 6 days.

(21) Appl. No.: 17/168,915

(22) Filed: Feb. 5, 2021

(65) Prior Publication Data
US 2021/0264447 A1    Aug. 26, 2021

Related U.S. Application Data

(63) Continuation of application No. 15/380,488, filed on Dec. 15, 2016, now Pat. No. 10,937,041.
(Continued)

(51) Int. Cl.
*G06Q 30/02* (2012.01)
*H04L 67/02* (2022.01)
(Continued)

(52) U.S. Cl.
CPC ..... *G06Q 30/0201* (2013.01); *G06Q 30/0244* (2013.01); *G06Q 30/0277* (2013.01);
(Continued)

(58) Field of Classification Search
CPC ........... G06Q 30/0201; G06Q 30/0244; G06Q 30/0277; H04L 67/02; H04L 67/22; H04L 67/306; H04L 67/535
(Continued)

(56) References Cited

U.S. PATENT DOCUMENTS 8,732,240 B1* 5/2014 Tomkins ............... G06F 16/438
                                                709/224
9,596,508 B2* 3/2017 McCoy ............ H04N 21/42201
(Continued)

OTHER PUBLICATIONS

Capturing evolving visit behavior in clickstream data. Moe, Wendy W. et al.. Journal of Interactive Marketing; Winter 2004; 18, 1; ProQuest Central, p. 5.*
(Continued)

*Primary Examiner* — Timothy Padot
(74) *Attorney, Agent, or Firm* — Hamilton, Brook, Smith & Reynolds, P.C.

(57) ABSTRACT

Online retailers and advertisers typically attempt to glean information about a potential customer from his or her web browser click history. However, relying on only a potential customer's click history is not an effective means for tailoring and personalizing web content for the user in the moment of customer interaction with the web content. Obtaining information about the user's engagement with web content is critical to successful personalization of web content in real-time. The present invention provides solutions for monitoring, tracking and calculating user engagement with web content that enables successful personalization of web content in the moment of interaction. The features of the present invention improve the customer experience of shopping online for products by providing web content that is personalized and targeted to the customer, as well as providing online retailers with a way of customizing the customer's shopping experience such that prospective customers convert to buyers at a high rate.

17 Claims, 5 Drawing Sheets

Related U.S. Application Data

(60) Provisional application No. 62/368,883, filed on Jul. 29, 2016.

(51) Int. Cl.
*H04L 67/306* (2022.01)
*H04L 67/50* (2022.01)

(52) U.S. Cl.
CPC ............ *H04L 67/02* (2013.01); *H04L 67/306* (2013.01); *H04L 67/535* (2022.05)

(58) Field of Classification Search
USPC .......................................................... 705/7.29
See application file for complete search history.

(56) References Cited

U.S. PATENT DOCUMENTS

| | | | |
|---|---|---|---|
| 10,937,041 B2 | 3/2021 | Sprague et al. | |
| 2002/0063735 A1* | 5/2002 | Tamir ................... | G06F 11/3476 714/E11.204 |
| 2006/0041548 A1* | 2/2006 | Parsons ................. | G06F 16/954 707/999.005 |
| 2009/0248494 A1* | 10/2009 | Hueter ............... | G06Q 30/0202 705/7.29 |
| 2011/0320319 A1* | 12/2011 | Streich .................... | G06F 16/29 715/765 |
| 2014/0278308 A1* | 9/2014 | Liu ........................ | G06F 16/958 703/6 |
| 2014/0278746 A1* | 9/2014 | Kolowich .......... | G06Q 30/0201 705/7.29 |
| 2014/0280890 A1* | 9/2014 | Yi ......................... | H04L 67/535 709/224 |
| 2016/0189153 A1* | 6/2016 | Luk ...................... | G06Q 20/405 705/44 |
| 2018/0033026 A1 | 2/2018 | Sprague et al. | |

OTHER PUBLICATIONS

Ad-Blocking Programs Give Surfers Opportunity to Nix Unwanted Ads. Brown, Karen. Cable World 11.32: 16. Access Intelligence, LLC. (Aug. 9, 1999).*

U.S. Non-Final Office Action for U.S. Appl. No. 15/380,488, entitled "Forward Context Browsing," dated Mar. 2, 2020.

U.S. Notice of Allowance for U.S. Appl. No. 15/380,488, entitled "Forward Context Browsing," dated Nov. 6, 2020.

Moe, Wendy W. et al., "Capturing evolving visit behavior in clickstream data," Journal of Interactive Marketing; Winter 2004; 18, 1; ProQuest Central. p. 5.

KiraCom Introduces a New Model for Interactive Marketing on the Internet. PR Newswire [New York] May 1, 2000: 1.

Springer, Robert, "Personalizing personalization: it's about more than just knowing your user's name," EContent 37.4: 8(3). Information Today, Inc. (May 2014).

\* cited by examiner

FORWARD CONTEXT BROWSING

RELATED APPLICATION(S)

This application is a continuation of U.S. application Ser. No. 15/380,488, filed Dec. 15, 2016, which claims the benefit of U.S. Provisional Application No. 62/368,883, filed on Jul. 29, 2016. The entire teachings of the above applications are incorporated herein by reference in their entirety.

BACKGROUND

In the past, web page content was mostly static. Over time, web page content has become dynamic and malleable. Real-time modification of web page content can have significant impact on user behavior.

SUMMARY

The main purpose of online advertising is to get potential customers to a web site where they will buy a product. Previously, online advertising based on static web content simply directed a user to a website with the hope that the user will actually buy the product. Content based online advertising relies on editors or product reviewers writing online articles and reviews about products. These online articles and reviews are also intended to lead the user to a product website but in a manner that increases the chances that after arriving at the product website, the user will actually buy the product.

Online retailers and advertisers typically attempt to glean information about a potential customer from attributes in the web page request. When a potential customer arrives at retailer's website, the retailer may be able to determine how the user arrived at the website based on the referrer attribute. For example, the referrer can reveal whether the user arrived at the website by following a link in an advertisement or whether the user followed another path that eventually led to the product website. Therefore, Web content (i.e. article, review) informing users about a product can direct the users to the product website and also inform the product website how the user arrived at the website (i.e. the referrer attribute). Based on this information, a product website can obtain some insight about the user's interest, allowing the product website to dynamically redesign and personalize the web content on the landing page. For example, the referrer for the potential customer may indicate that prior to arriving at the product website, the customer had read an in-depth article or review about the product and subsequently clicked on a link offering a coupon for the product mentioned in the article. In this case, the customer is already highly informed about the product and should be treated differently from a customer having no knowledge about the product. A customer having no knowledge of the product can arrive at the product website by clicking on an advertisement containing minimal information about the product. Tailoring and personalization of the landing page's web content, in a moment of customer interaction (real-time), based on customer knowledge about a product can result in a higher conversion rate of potential customers to actual buyers.

However, relying on only a potential customer's source is not an effective means for tailoring and personalizing web content for the user in the moment of interaction with the web content. Many sites instruct the browser not to pass along referrer information. Even for sites that do, it is very minimal information on which to customize the landing page. For example, how can we know that the user was truly engaged in reading product's online review? The user can simply scan the article or not read it at all. Perhaps the user read only portions of the online article. Thus, the user's engagement with the online product review or article is indicative of the user's knowledge of the product. Obtaining information about the user's engagement with web content is critical to successful personalization of web content in the moment of user interaction. An embodiment of the present invention provides solutions for monitoring, tracking and calculating user engagement with web content that enables successful personalization of web content in the moment of user interaction. The features of the present invention improve the customer experience of shopping online for products by providing web content that is personalized and targeted to the customer, as well as providing online retailers with a way of customizing the customer's shopping experience such that prospective customers convert to buyers at a high rate.

Know Your Customer is a common mantra across sales and marketing in all disciplines. In person to person sales, the vendor covets introductions to customers by other trusted parties, and the content of these introductions significantly impact how the vendor approaches the sale. For example, if a vendor is introduced to a potential customer by a third party who notes that he already told the prospect all about the features of a product, the vendor will address the prospect very differently from another who came in on a cold call. The present invention enables a mechanism for third party web sites to convey detail about a prospect to a vendor site. This enables the vendor web site to customize its pitch appropriately.

In some embodiments, the present invention considers that prospects may be referred to a vendor from a wide variety of sites that are themselves often changing. By establishing a common language by which a referring site can express the qualifications of the prospect, the vendor site better service referrals by many diverse sites.

In some embodiments, a data processing system may be configured to provide qualification information regarding an end user device during a potential sales process. The qualification information may be rendered in an electronic packet that bundles qualification data about a prospective customer target into a common format. The electronic packet may be generated in response to a user event at a sales site of a third party service provider operating on a communication network. The electronic packet may be configured in a common computer readable format that computationally qualifies a user operating a computational device. The electronic packet may include qualifying data that inform a sales process including qualifying the user based on at least one of: gender bracket or age bracket. The qualifying data may also include an indication and associated password to inform the sales process to block advertising clutter. The sales process may be processed at least in part via a third party service provider. Using a communication interface arranged, third party service provider being transmitted the prospective customer qualification packet. The electronic packet being configured to cause the third party service to trigger, in the moment of interaction (real-time), modification to web content at the sales site including causing implementation of a Call to Action transmission link configured to personalize the sales process on the landing page transmitted to the user's computational device. The electronic packet being configured to cause the third party service to trigger, in the moment of customer interaction, modification to remove advertising clutter, such as unrelated advertising popups, from web content on the landing page.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Digital Processing Environment

Figure 1A:
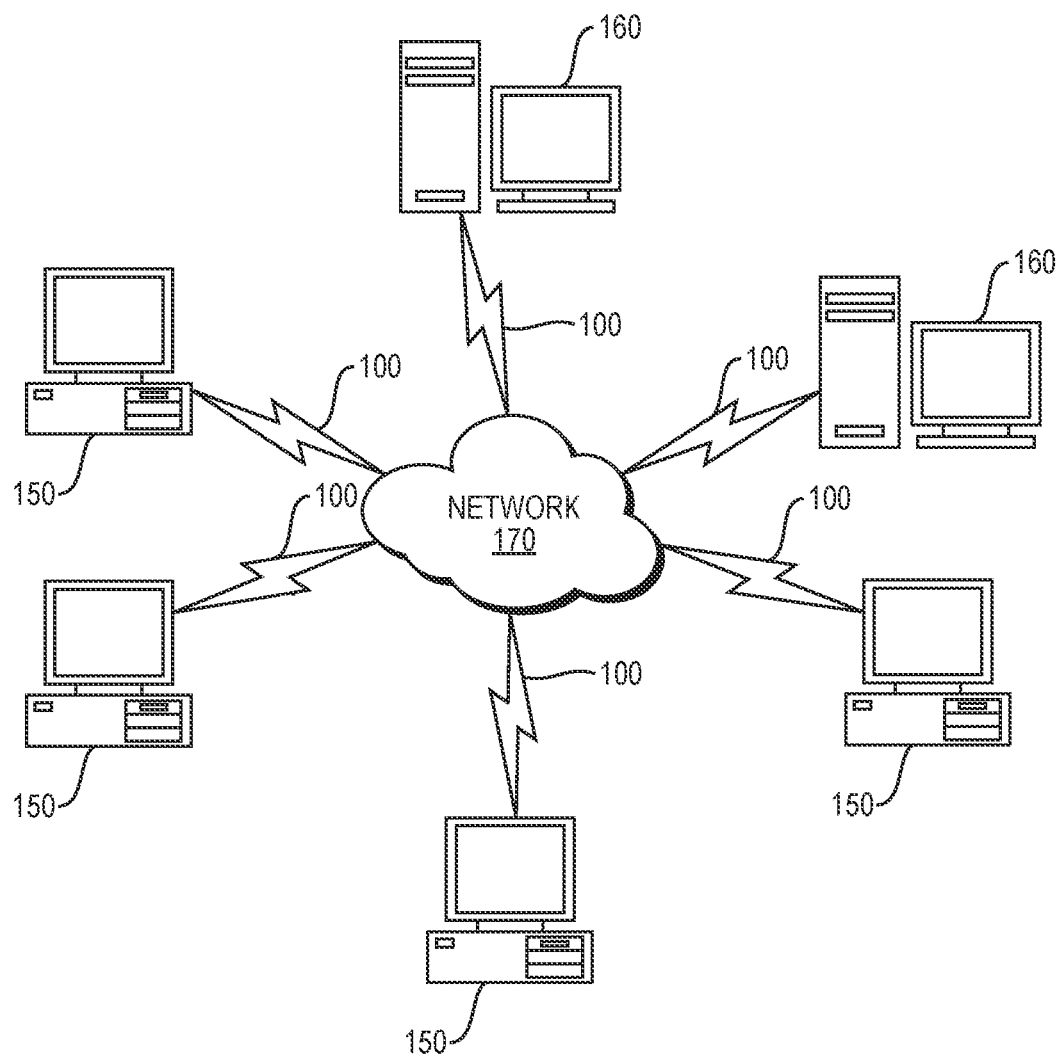
FIG. 1A is a diagram illustrating a computer network or similar digital processing environment in which the present invention may be implemented.

An example implementation of a system according to the invention may be implemented in a software, firmware, or hardware environment. FIG. 1A illustrates one such example digital processing environment in which embodiments of the present invention may be implemented. Client computers/devices 150 and server computers/devices 160 (or a cloud network 170) provide processing, storage, and input/output devices executing application programs and the like. Client computers/devices 150 may be linked directly or through communications network 170 to other computing devices, including other client computers/devices 150 and server computer/devices 160.

The communication network 170 can be part of a wireless or wired network, remote access network, a global network (i.e. Internet), a worldwide collection of computers, local area or wide area networks, and gateways, routers, and switches that currently use a variety of protocols (e.g. TCP/IP, Bluetooth®, RTM, etc.) to communicate with one another. The communication network 170 may also be a virtual private network (VPN) or an out-of-band network or both. The communication network 170 may take a variety of forms, including, but not limited to, a data network, voice network (e.g. land-line, mobile, etc.), audio network, video network, satellite network, radio network, and pager network. Other electronic device/computer networks architectures are also suitable.

Server computers 160 may be configured to provide system 100. The server computers may not be separate server computers but part of cloud network 170.

Figure 1B:
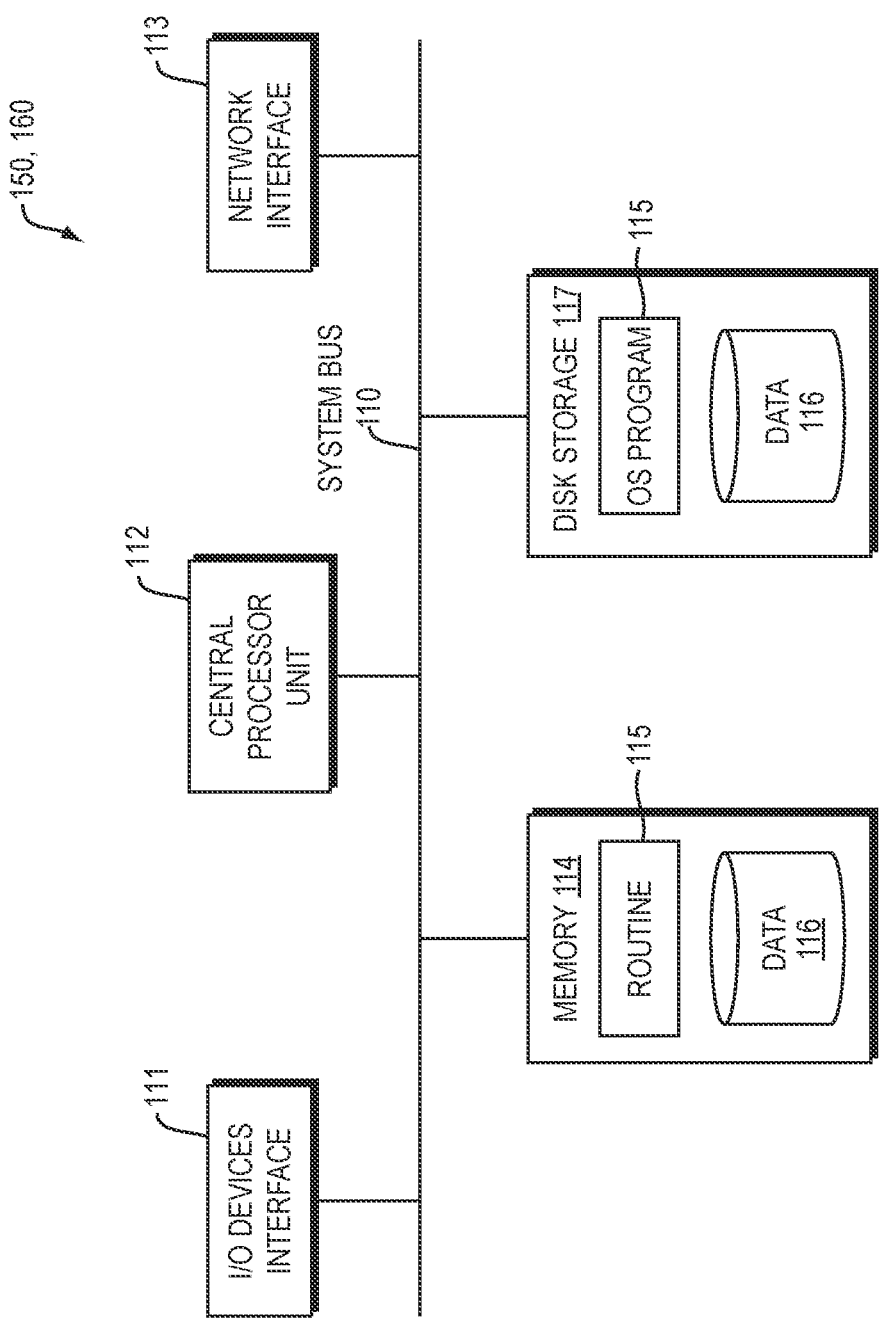
FIG. 1B is a block diagram of certain components of the computer nodes in the network of FIG. 1A.

FIG. 1B is a block diagram of any internal structure of a computer/computing node (e.g., client processor/device 150 or server computers 160) in the processing environment of FIG. 1A, which may be used to facilitate displaying audio, image, video or data signal information. Each computer 150, 160 in FIG. 1B contains a system bus 110, where a bus is a set of actual or virtual hardware lines used for data transfer among the components of a computer or processing system. The system bus 110 is essentially a shared conduit that connects different elements of a computer system (e.g., processor, disk storage, memory, input/output ports, etc.) that enables the transfer of data between elements.

Attached to the system bus 110 is an I/O device interface 111 for connecting various input and output devices (e.g., keyboard, mouse, touch screen interface, displays, printers, speakers, audio inputs and outputs, video inputs and outputs, microphone jacks, etc.) to the computer 150, 160. A network interface 113 allows the computer to connect to various other devices attached to a network (for example the network illustrated at 170 of FIG. 1A). Memory 114 provides volatile storage for computer software instructions 115 and data 116 used to implement software implementations of some embodiments of the present invention. Such components 115, 116 of the system 100 described herein may be configured using any programming language, including any high-level, object-oriented programming language, such as Python.

Software components 114, 115 of the system 100 described herein may be configured using any known programming language, including any high-level, object-oriented programming language. The system 100 may include instances of processes, which allow third party service providers/users to facilitate modification to web content in the moment of interaction with the web content. The system may include instances of an engagement scoring engine, which can be implemented as a client that communicates to the server 160 through SSL and computes an engagement score that provides a measure of confidence about the level of user engagement with web content. Preferably, the engagement score includes data arranged to inform a vendor on the qualification of the prospective customer. In some embodiments, facilitating of web content, in the moment of interaction, based on a level of user engagement with online content in a web browser running on the computing device 150 may be implemented via a software embodiment and may operate, at least partially, within the browser session.

In an example mobile implementation, a mobile agent implementation of the invention may be provided. It can use, for example, the XMPP protocol to tether, in the moment of interaction (real-time), web content modification 115 on the device 150 to a server 160. The server 160 can then issue commands to the phone on request. The mobile user interface framework to access certain components of the system 100 may be based on XHP, Javelin and WURFL. In another example mobile implementation for OS X and iOS operating systems and their respective APIs, Cocoa and Cocoa Touch may be used to implement the client side components 115 using Objective-C or any other high-level programming language that adds Smalltalk-style messaging to the C programming language. The system may also include instances of server processes on the server computers 160.

Disk storage 117 provides non-volatile storage for computer software instructions 115 (equivalently "OS program") and data 116 used to implement embodiments of the system 100. The system may include disk storage accessible to the server computer 160. The server computer can maintain secure access to records related to the authentication of users registered with the system 100. Central processor unit 112 is also attached to the system bus 110 and provides for the execution of computer instructions.

In one embodiment, the processor routines 115 and data 116 are computer program products, e.g. an engagement scoring engine (generally referenced 115), including a computer readable medium capable of being stored on a storage device 117, which provides at least a portion of the software instructions for the device identification system 100. Executing instances of respective software components of the device identification system 100, such as instances of an engagement scoring engine may be implemented as computer program products 115, and can be installed by any suitable software installation procedure, as is well known in the art. In another embodiment, at least a portion of the system software instructions 115 may also be downloaded over a cable, communication and/or wireless connection via, for example, a browser SSL session or through an app (whether executed from a mobile or other computing device). In other embodiments, the system 100 software components 115, may be implemented as a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present device identification system 100 of FIG. 1D.

Facilitating Modification to Web Content in the Moment of Interaction

User analytics are typically based on the user behavior of past visitors/users. Online retailers have little or no information about the personal preferences of the current visitor other than cookies associated with the current visitor's web browser—for example, whether the current user is a new visitor or has previously visited the website. However, in order to convert a prospective customer to a buyer requires treating a prospective customer having minimal or no knowledge of the product differently from one that is knowledgeable about the product.

Figure 2:
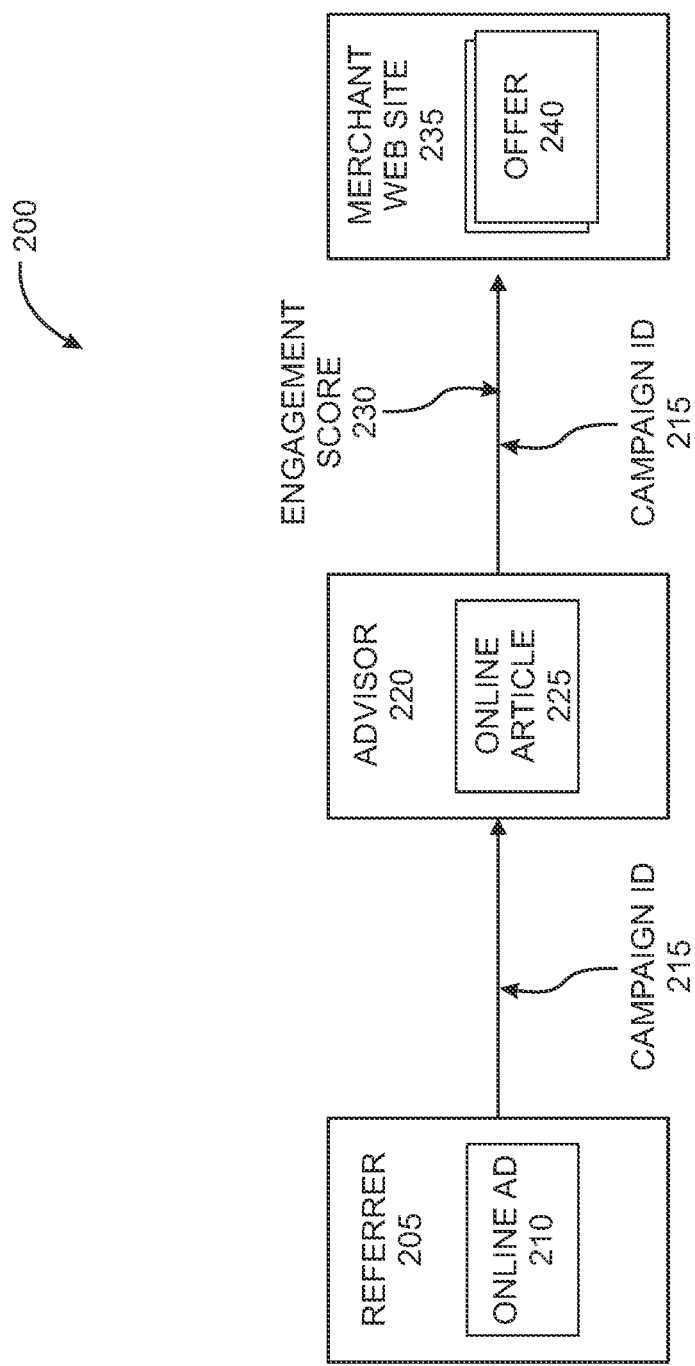
FIG. 2 is a block diagram of a system implemented according to an embodiment of the present invention.

FIG. 2 is a block diagram 200 illustrating an embodiment of the present invention. A Referrer 205 leads a potential customer via Online Ad 210 to Advisor 220 that in turn leads the potential customer to the Merchant Web Site 235 via Online Article 225. Referrer 205 provides Online Ad 210 in a web browser running on a user's machine. Online Ad 210 is associated with a specific marketing campaign or special offer indicated by Campaign ID 215. If Online Ad 210 captures the user's interest, the user clicks on a link associated with Online Ad 210 causing Referrer 205 to send the user and Campaign ID 215 to Advisor 220. In an embodiment, the Advisor 220 provides the user with web content in the web browser in the form of Online Article 225. In an embodiment, Online Article 225 is a review or article about a product associated with Campaign ID 215. Advisor 220 monitors and tracks user behavior and interaction with Online Article 225. In some embodiments, Advisor 220 monitors and tracks user behavior via a listener embedded within the Online Article 225. In an embodiment, Advisor 220 renders the web content in the web browser and before the web browser draws the page containing the web content such that it would be visible in the web browser, it raises an event indicating that the browser is about to draw the web content.

In some embodiments, the inventive system 200 includes a scripted listener as a portion of the webpage. For instance in one embodiment, the listener may be implemented in java script without requiring modification of the end-user's browser. The listener can decipher data instructs a vendor on the qualification of the prospective customer operating an end user internet browser at the client system. In some embodiments, the listener can be implemented a browser plugin that implements a listener.

In some embodiments, the Advisor 220 raises an event indicating that the browser is about to draw the web content. For example, a listener maybe executed to detect when the browser is about to draw the web content provided by Advisor 220. Thus, in response to detecting that the browser is about to draw the page at the Advisor 220, the plugin or event listener causes control of the page to be intercepted from the browser. Software code in the third party website may be automatically updated and certain code potentially replaced in the third party content to configure the listener.

The event listener monitors and tracks user interaction while the user is viewing the Online Article 225. An Engagement Score 230 is calculated based on the monitored and tracked user behavior and interaction. Preferably, the engagement score includes data arranged to inform a vendor on the qualification of the prospective customer at the client. In this way, a referrer system may be provided that computationally deciphers the proactive context information of the client system and transfers that information via a communication network to a vendor computer system.

In some examples, the engagement score may be calculated based on specific user actions such as clicking on a link placed at the end of Online Article 225 cause Advisor 220 to send the user, Campaign ID 215 and calculated Engagement Score 230 to Merchant Web Site 235. Based on the calculated Engagement Score 230 and Campaign ID 215, Merchant Web Site 235 configures the offer or directs the user to a personalized and customized landing page having Offer 240. In this way, the webpage will not have to redirect to another, which is typically required conventionally. Instead, the webpage will be reconfigured with a preprocessor that just dynamically configures itself.

Engagement Score Calculation

The user engagement score is based on factors indicative of the user's behavior while viewing or interacting with web content. For example, in calculating the engagement score, embodiments of the present invention obtain information about how the user arrived at the web content and the length of time the user spent viewing the web content. The length of time between scrolls indicates whether the user is reading the article in a paced manner. For example, a user scrolling quickly through an article is indicative of low user engagement and decreases the engagement score while a user scrolling quickly through the article in a paced manner is indicative of a higher user engagement and increases the engagement score. For example, a user opening an online article and scrolling to the bottom of the page within 10 seconds, decreases the engagement score. A mouse hovering over other items while the user is viewing the web content also decreases the engagement score. Thus, a combination of several factors such as user click history, scroll and mouse behavior indicates the user's engagement with the content in the online article and is therefore, contributes to the calculation of the user's engagement score. Also, a user may have visited a content page one or more times before. This can indicate a period of deliberation. In some embodiments, other factors, including known traits of the user, such as the gender of the user, the net worth of the user, whether the user is a frequent traveler, geographic information of the user (e.g., from a geo location service or IP address location), and the like may also contribute to the calculation of the user's engagement score.

The engagement score is a subjective calculation and may be implemented with different algorithms on different sites. The goal of the referring site and the vendor site are aligned, so there is a mutual desire to achieve the most accurate measurement of a prospect.

Engagement Score Calculation Examples

An engagement score can be computed based on a number of factors. Preferably, the engagement score is calculated based on a multitude of additional tests/factors associated with the level of user engagement with web content, such as the user's mouse movements, as well as a range of additional context verification factors.

Figure 3:
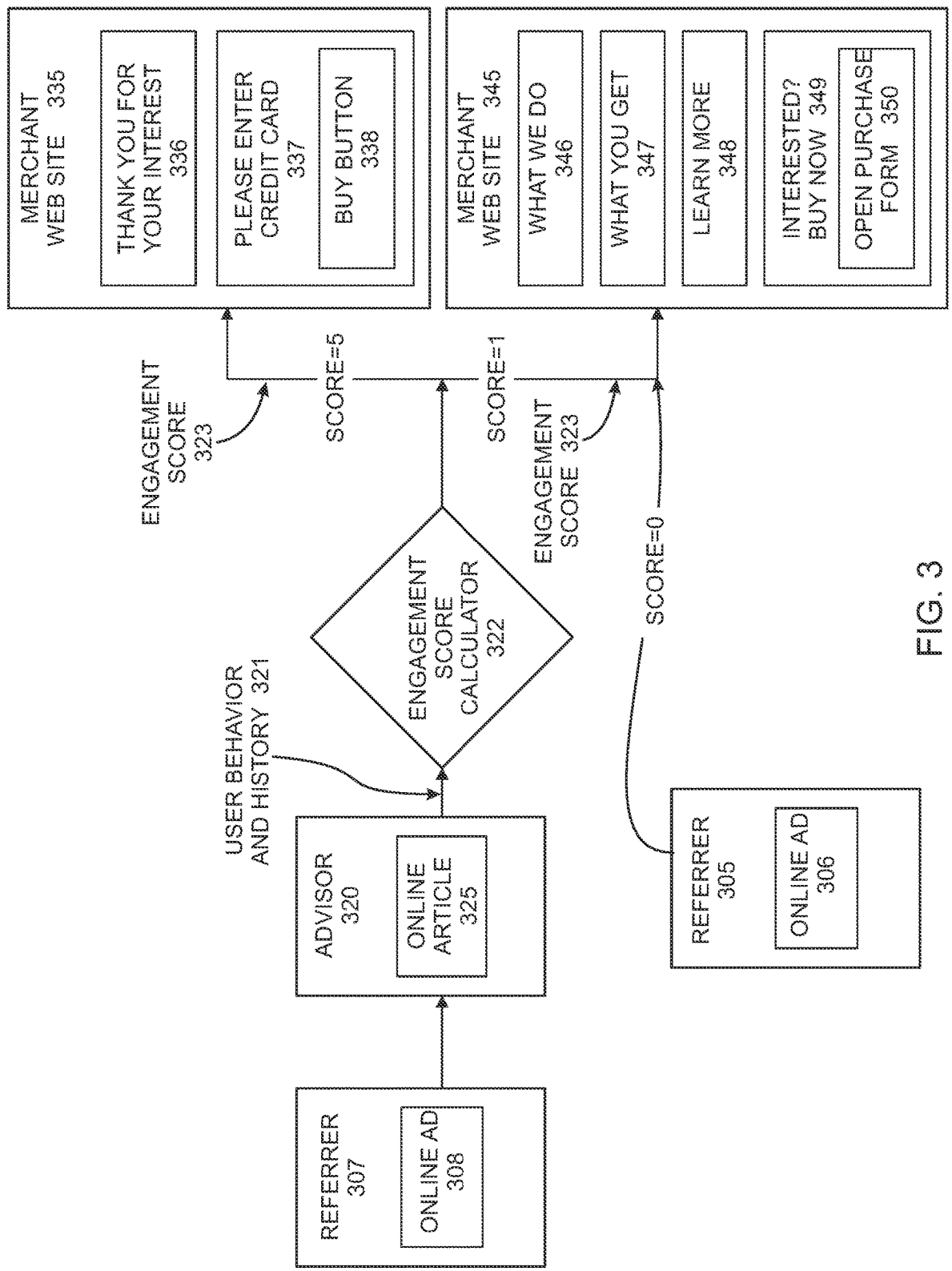
FIG. 3 is a flow diagram illustrating a process employed by an embodiment of the present invention.

FIG. 3 is a flow diagram 300 illustrating an embodiment of the present invention. In a first scenario, there is no calculation of a user engagement score. Referrer 305 provides users with Online Ad 306 containing minimal information about a product. User interaction with Online Ad 306, directs the user to a landing page on Merchant Web Site 345. However, without a user engagement score, the Merchant Web Site 345 assumes that the user has minimal or no knowledge about the product and therefore, provides basic product information such as "What we do" 346, "What you get" 347, "Learn More" 348 and "Interested? Buy now" 349 further providing an "Open purchase form" 350.

In second scenario, Referrer 307 provides Online Ad 308. User interaction with Online Ad 308 directs the user to Advisor 320 and web content in the form of Online Article 325. Advisor 320 monitors and tracks user behavior and interaction with Online Article 325. In an embodiment, the monitoring script is embedded in Online Article 325. Specific user actions such as clicking on a link placed at the end of Online Article 325 trigger the tracked User Behavior and History 321 to be sent to an Engagement Score Calculator 322. In an embodiment, the Engagement Score Calculator 322 is a third party entity having, in some embodiments, a database that evaluates the User Behavior and History 321 and calculates the Engagement Score 323. In some embodiments, the third party site may base its calculation entirely on interaction with no prior (or perhaps future) knowledge of the user, and thus, a database is not necessary. A user highly engaged with Online Article 325 has a high Engagement Score 323 indicating that the user is knowledgeable about the product described in Online Article 325. Therefore, a potential customer arriving at the Merchant Web Site 335 with a high Engagement Score 323 is associated with a customer that is likely to buy the product. Therefore, the content on the landing page on Merchant Web Site 335 facilitates the purchase of the product by presenting the customer with "Thank you for your interest" 336 and "Please Enter Credit Card" 337 along with "Buy Button" 338.

In contrast, a user not engaged with Online Article 325 has a low Engagement Score 323 indicating that the user has minimal or no knowledge about the product described in Online Article 325. Thus, Merchant Web Site 335 provides basic product information such as "What we do" 346, "What you get" 347, "Learn More" 348 and "Interested? Buy now" 349 further providing an "Open purchase form" 350 (similar to as shown for Merchant Web Site 345).

Referring, for example, to FIG. 3, in an embodiment, each of the factors associated with user behavior and interaction while viewing Online Article 320 is assigned a weight. The engagement score calculation determines whether a factor is present, and if it is present, it is included in the aggregated total. The engagement scoring engine looks to the factor with the highest weighting assigned to it, and designates it as the "first factor", while the factor with the next associated highest weight is designated the "second factor," and the process continues in a similar manner for third, fourth . . . factors.

Engagement Scoring Analytics

Information related to additional context verification test/factors used in the calculation of an engagement score, including information regarding which tests/factors are successfully applied versus those that were processed but were not successfully applied can be used to improve the quality of the engagement scoring engine. For example, an analytics tool (such as a web analytics tool or BI tool) may produce various metrics such as measures of additional context verification factor/test success based on the combination of other criteria (e.g. environment variables associated with level of user engagement with online content), and filter these results by time of the day or time period or location. Such measures can be viewed per test/factor to help improve the engagement scoring engine/agent/tool because the results may be aggregated across a multitude of devices, users, and third party service providers.

An analytics tool offers the possibility of associating other quantitative data beside frequency data with a successful test/factor application. For instance, the results of a high engagement score calculation could be joined against the metrics derived by an analytics system (such as a web analytics solution or a business intelligence solution).

Furthermore, analytics data for a calculated engagement score for a user can be aggregated per type of user. For example, it could be of interest to know which types of tests/factors are most or least conducive to a high engagement score calculation, or on the contrary, applied to a low engagement score calculation.

Engagement score analytics can be used to discovers useful trends in user behavior. For example, determining how the user found the web content, the user's engagement with the web content and where the user went to after viewing the web content are useful for developing heuristics for modification of web content in the moment of interaction. For example, if it turns out that a large percentage of users after viewing specific created web content subsequently choose to click a link on the bottom of the page leading them to the product web site and resulting in an actual purchase of the product, an online retailer of the product can decide to spend more money on advertisements that direct users to the specifically created web content.

Some embodiments collect user behavior data for later analysis. When a user exits the web content, some embodiments send the monitored and tracked user behavior data to a repository to be stored and analyzed at a later time. For example, if user behavior data collected over a period of time reveals that visitors arriving at a product website around 10 P.M. tend to actually purchase a product, then a visitor to the product website site around 10 P.M. is treated differently from a visitor that arrives at the product website at 6 P.M.

Personalized Web Content

Figure 4:
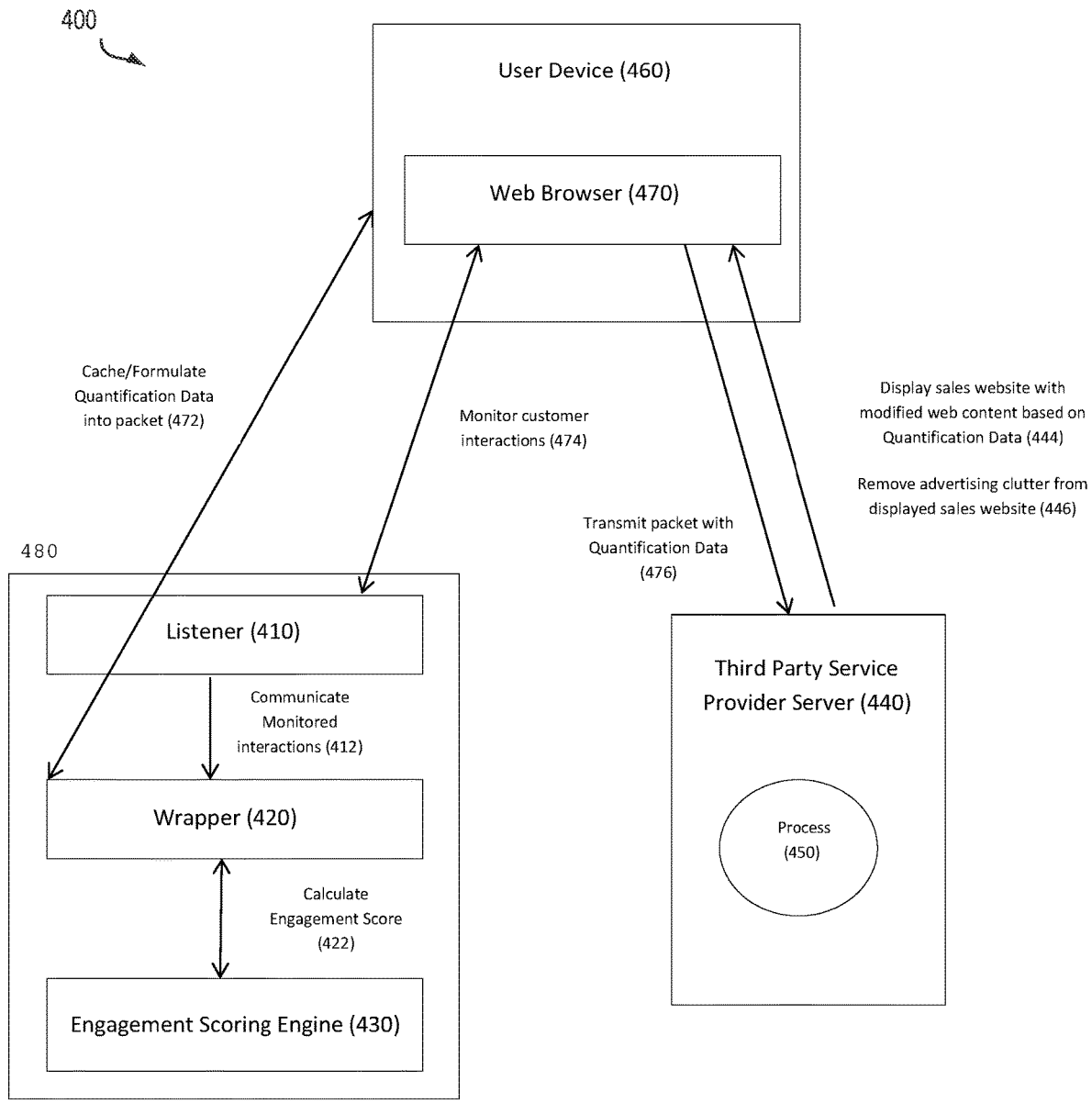
FIG. 4 is a block diagram of system components in embodiments of the present invention.

FIG. 4 is a block diagram of a content engagement system 400 in embodiments of the present invention. The content engagement system 400 includes a listener (event listener script) component 410, wrapper component 420, and engagement scoring engine component 430. These components 410, 420, 430 of the content engagement system 400 are operably coupled to the web browser 470 executing on the user device 460 of a prospective customer. In some embodiments, some or all of these components 410, 420, 430 of the content engagement system 400 may be controlled by a server 480 of a content advertiser or content publisher (conduit to seller). The listener 410 computationally deciphers the monitored and tracked customer interactions 474 with web content, such as within a content article, via the web browser 470. The wrapper 420, in communication with the listener 410, caches and formulates 472 the communicated monitored and tracked interactions 412 of the prospective customer as qualification data. The wrapper 420 is also in communication with the engagement scoring engine 422 that calculates an engagement score 422 based on the communicated monitored and tracked interactions 412, which is included in the qualification data. The wrapper 420 may then bundle the qualification data of the prospective customer target into an electronic packet in a common computer readable format, such as HTTP. The wrapper 420 may also include in the electronic packet a Universal Resource Locator (URL), or other indicator, of a sales website requested (e.g., via clicking a website link in the content article or other web content) by the prospective customer in relations to the web content.

In some embodiments, the qualification data in the electronic packet also includes an indication to display the requested sales website without other advertising clutter or attention grabbers, such as popup advertisements or other extra advertisements. The indication enables the advertising clutter to be blocked by request. In some embodiments, the wrapper 420 may include an attribute, such as "&noclutter=true" in the URL for the website requested by the prospective customer. In other embodiments, the wrapper 420 may include a no-clutter code in a data field of the electronic packet or in the quantification data. The third party service provider server 440 may analyze the no-clutter indicator (as a feature), along with the other qualification data, when modifying the sales website requested by the prospective customer for display. In other embodiments, the listener event script 410 of the content engagement system may directly modify the sales website from the third-party service provider server 440 to block or remove the advertising content.

The no-clutter indicator may further include a one-time password (OTP), such as a time-based one time password (TOTP) or HMAC-SHAI OTP (HOTP), other such authorization data. This password may be used by the receiver of the quantification data to verify that the sender is authorized to suppress the advertising clutter. For example, the verification of the password may provide a third party service provider receiving the packet confidence that the advertising clutter is being removed by an authorized content adviser of the context engagement system. In some embodiments, the OTP, similar to the technology used in RSA key fobs, may be generated as a random authentication code/token, either periodically time-based generated (TOTP) or generated for one-time use (HOTP). This random code/token may be placed in the qualification data by the wrapper 420 of the content advertiser/publisher server 480 and shown to the third party service provider of the quantification data for verifying the request. Mathematical methods may be used to verify that the random code/token received in the quantification data is a valid password for the content adviser at the point of time of transmitting the packet.

In some embodiments, the server 480 of the content advertiser or content publisher can authenticate to the third party service provider server 440 through the open path of the browser 470 using the OTP mechanism. The content advertiser/publisher server 480 may exchange secret keys with the third party service provider server 440, using the known methods of generating OTP authentication code/tokens. The content advertiser/publisher server 480 may pass the authentication token to the third party service provider server 440 by adding the token to the link in the browser 470 (in the URL for the website requested by the prospective customer), so as to pass an authentication token to the third party service provider server 440. In this way the two servers are never directly in communication, apart from the original exchange of secret keys, but yet a request being made can still be qualified to a known origin of the qualified content advertiser/publisher server 480.

The user device 460 of the prospective customer may then transmit the electronic packet with the qualification data 476 to a third party service provider server 440. A sales process 450 executing on the server 440 receives the electronic packet with the qualification data for the prospective customer. The sales process 450 displays a particular sales website based on the web content identified in the received qualification data. The sales process 450 further triggers, in the moment of interaction, modifications to the web content displayed on the sales website consistent with the qualification data 444, including the engagement score. The modifications in the moment of interaction by the sales process 450 may be triggered by a Call to Action transmission link configured to personalize the web content on the landing page of the sales site based on the qualification data. In particular, the Call to Action transmission link may tailor the web content on the landing page based on the prospective customer's level of engagement with the content, as indicated by the engagement score in the qualification data. The Call to Action link may be used along with the no-clutter indicator, and associated password, of the quantification data, to verify and remove advertising clutter 446 unrelated to the personalized web content from the landing page of the sales site.

For example, in this way, a prospective customer may link to a content article by a publisher from a front-end of a website, such as social networking website (e.g., Facebook), via the web browser 470 executing on the user device 460. Based on the interaction of customer within the content article, the wrapper 420 transmits 476 a content request of the customer to the service provider server 440, along with quantification data (including the no-clutter indicator and associated password). In response to verifying the no-clutter indicator, the sales process 450 executing on the server 440 cleanses the displayed content of extra advertising clutter and focuses on the Call to Action transmission link tailoring the content on the landing page based on the quantification data. If the prospective customer, instead, directly retrieves the content organically from a sales website of the third-party service provider, the server 440 would display the content with the usual advertising clutter, as the third-party service provider is not provided a qualified (no-clutter) indication of intent and authorized password for removing the clutter.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A data processing system comprising a processor and a non-transitory computer-readable medium having processor instructions stored thereon, the processor configured to provide qualification information regarding a computing device the data processing system comprising:
   an electronic packet generated in response to a user event in communication via a communication network at a sales site of a third party service provider operating on a communication network;
   the electronic packet being configured in a common format that computationally qualifies a user operating a computational device, the electronic packet including qualifying data that inform a sales process including qualifying the user based on at least one of: gender bracket or age bracket, the sales process being processed at least in part via a third party service provider;

a communication interface arranged to cause the third party service provider to receive the user qualification electronic packet; and the electronic packet being configured to cause the third party service provider to trigger modification to online content at a web page being processed via a web browser at the computing device in a moment of interaction at the sales site including causing implementation of a Call to Action transmission link configured to personalize the sales process on the landing page transmitted to the computing device, such that before the web browser draws a further webpage on a user interface of the computing device, the web browser is directed to raise an event indicating that the browser is about to draw the webpage, which causes the webpage that is about to be drawn on the user interface of the computing device to be modified based on a calculated engagement score and triggers modification to remove advertising clutter from the online content in the moment of interaction.

2. The system of claim 1, wherein the communication interface is further configured to:

enable the third party service provider to receive an indication to block advertising clutter and an associated password; and upon verifying the associated password, trigger modification to remove the advertising clutter from the online content in the moment of interaction.

3. The data processing system of claim 1, wherein:

the qualifying data that informs the sales process further includes an indication to block advertising clutter and an associated password; and the electronic packet being configured to cause the third party service provider, upon verifying the associated password, to trigger modification to remove the advertising clutter from the online content in the moment of interaction at the sales site.

4. The data processing system of claim 1, wherein the electronic packet being configured to cause the third party service provider to trigger modification to online content further includes the least one electronic packet causing an event listener to be embedded in the online content transmitted to the communication interface of the computing device.

5. The data processing system of claim 4, further including the computing device interfacing with the event listener embedded in the online content, the event listener being processed by the computing device, and without modification to the web browser of the computing device, the event listener causing control of the webpage to be intercepted from the web browser of the computing device to a third party service provider server; and the event listener configured to detect and track user browser activity and user interaction with a portion of online content in a web browser running on a computing device.

6. The data processing system of claim 5, wherein an electronic wrapper, in communication with the event listener, configured to cache data of the detected and tracked user interaction and user web browser activity;

an engagement scoring engine, in communication with the electronic wrapper, configured to calculate an engagement score based on (i) the cached data and (ii) user web browser activity, the engagement score reflecting the user's level of engagement with the portion of online content; and a communication interface of the computing device configured to enable a third party service provider server to receive the calculated engagement score and triggers modification to online content in a moment of interaction with the online content;

the third party service provider server responding by tethering the computing device to the third party service provider server via Extensible Messaging and Presence Protocol (XMPP), and triggering modification to the online content in a moment of interaction with the online content, such that before the web browser draws a further webpage on a user interface of the computing device, the web browser is directed to raise an event indicating that the browser is about to draw the webpage, which causes the webpage that is about to be drawn on the user interface of the computing device to be modified based on the calculated engagement score including:

sending an indication to block advertising clutter and an associated password to the third party service provider server, and triggering modification to remove the advertising clutter from the online content in the moment of interaction.

7. The data processing system of claim 5, wherein the detected and tracked user interaction with the portion of online content includes user scroll behavior, user mouse behavior and length of time between scrolls.

8. The data processing system of claim 5, wherein the portion of online content is an article or product review.

9. The data processing system of claim 6, wherein the engagement scoring engine is provided by the third party provider server.

10. The data processing system of claim 5, wherein the tracked user web browser activity and engagement score are stored in a repository.

11. The data processing system of claim 10, wherein the communication interface is further configured to calculate the engagement score is further based on previously collected data stored in the repository.

12. The data processing system of claim 5, wherein an engagement score above a pre-determined value is associated with a high level of user engagement with the portion of online content and a score below the pre-determined value is associated with a low level of user engagement with the portion of online content.

13. The data processing system of claim 6, wherein the electronic wrapper is triggered to dispatch the cached data and user session activity in response to pre-determined user activity.

14. The data processing system of claim 5, wherein the modification to online content in the moment of interaction includes an offer associated with a product.

15. The data processing system of claim 5, wherein the event listener is embedded within the portion of online content.

16. The data processing system of claim 5, the communication interface is further configured to:

send an indication to block advertising clutter and an associated password to the third party service provider server, the third party service provider server, upon receiving and verifying the password, triggering the modification to remove the advertising clutter from the online content in the moment of interaction.

17. The data processing system of claim 5, wherein the communication interface is further configured to:

enable the third party service provider server to receive an indication to block advertising clutter and an associated password; and upon verifying the associated password, trigger modification to remove the advertising clutter from the online content in the moment of interaction.

\* \* \* \* \*